(12) United States Patent
Snop

(10) Patent No.: US 7,005,104 B2
(45) Date of Patent: Feb. 28, 2006

(54) POWER MODULE FOR AN AUTOCLAVE

(75) Inventor: Vladimir Isakovich Snop, Moscow (RU)

(73) Assignee: AUTOCLAVE, High Pressure & Temperature Limited, Tortola (VG)

( * ) Notice: Subject to any disclaimer, the term of this patent is extended or adjusted under 35 U.S.C. 154(b) by 108 days.

(21) Appl. No.: 10/416,136

(22) PCT Filed: Nov. 8, 2001

(86) PCT No.: PCT/RU01/00470

§ 371 (c)(1),
(2), (4) Date: Oct. 14, 2003

(87) PCT Pub. No.: WO02/41985

PCT Pub. Date: May 30, 2002

(65) Prior Publication Data

US 2004/0065216 A1    Apr. 8, 2004

(30) Foreign Application Priority Data

Nov. 8, 2000   (RU) .............................. 2000127681

(51) Int. Cl.
*B01J 3/04* (2006.01)
(52) U.S. Cl. ...................................... 266/252; 432/295
(58) Field of Classification Search ................ 266/249, 266/252; 422/295, 292
See application file for complete search history.

(56) References Cited

U.S. PATENT DOCUMENTS 4,359,336 A    11/1982   Bowles
4,371,396 A     2/1983   Larsson
5,622,678 A  *  4/1997   Hiltawsky et al. .......... 422/295

FOREIGN PATENT DOCUMENTS

DE          3531003 A1      4/1986

(Continued)

OTHER PUBLICATIONS

ASEA AQ100-102R, Dec. 1977.

*Primary Examiner*—Scott Kastler
(74) *Attorney, Agent, or Firm*—Collard & Roe, P.C.

(57) ABSTRACT

The invention relates to the field of powder metallurgy, in particular to the design of autoclaves for manufacturing of composite materials by treatment of workpieces of discrete materials, mostly powders, at high pressures and temperatures.

The autoclave module contains the vessel that includes hermetically sealed movable end closures, the rams restricting the axial shift of these closures, and the pressure yoke with columns and winding made of high-strength steel wire, whereby the pressure yoke is made in the form of three oval yoke sections—two lateral sections encompassing the rams, and one central section encompassing the rams and the vessel with closures, all of them equidistant from each other on the ram's length, whereby each of the lateral oval sections is made in such a way as to allow opposite shift while the central section is made in such a way as to allow shift in the direction which is perpendicular to the vessel's axis and parallel to the rams' axis, for a length ensuring free withdrawal of the rams and the end closures.

The invention allows to reduce the metal consumption of the pressure module by a factor of 2 to 3 compared to the known analogs, and to enhance the reliability and the operational safety of the apparatus.

5 Claims, 3 Drawing Sheets

FOREIGN PATENT DOCUMENTS

| | | |
|---|---|---|
| EP | 0014975 A1 | 9/1980 |
| RU | 402185 | 12/1973 |
| RU | 412922 | 1/1974 |
| RU | 659185 | 4/1979 |
| RU | 948538 | 8/1982 |
| RU | 2114717 C1 | 7/1998 |
| RU | 2151026 C1 | 6/2000 |
| SU | 402185 | 11/1974 |

* cited by examiner

POWER MODULE FOR AN AUTOCLAVE

CROSS REFERENCE TO RELATED APPLICATIONS

Applicant claims priority under 35 U.S.C. §119 of Russian Application No. 2000127681, filed: Nov. 8, 2000. Applicant also claims priority under 35 U.S.C. §365 of PCT/RU01/00470, filed: Nov. 8, 2001. The international application under PCT article 21(2) was not published in English.

FIELD OF THE INVENTION

The invention relates to the field of powder metallurgy, in particular to the design of autoclaves for manufacturing of composite materials by treatment of workpieces of discrete materials, mostly powders, at high pressures and temperatures.

BACKGROUND OF THE INVENTION

There is known e.g. an analog pressure vessel for obtaining composite materials at high pressures and temperatures, containing a frame, closures with movable seals, a yoke with the upper and lower cross-bars absorbing the axial stress. The frame and the yoke are made immovable with respect to each other, and only the upper yoke cross-bar is made detachable (Inventor's Certificate of the USSR No. 412922, B01 J 3/04 of Feb. 09, 1971).

The shortcoming of this analog vessel is that it enables only the top loading of the material into the pressure vessel. Moreover, forged-welded or multilayer design of this high pressure vessel without built-in elements providing for cooling of the high pressure vessel itself, reduces significantly its technological capabilities both in terms of using high pressures and especially high temperatures during technological processing, as well as decreases its reliability and operational safety.

There is also known a second analog device for thermal treatment of powder materials under high pressure using high temperatures, as described in the USSR patent No. 402185, B 22 F 3/14 of Dec. 10, 1973. This analog excludes many shortcomings of the previously described analog since its block for absorbing the axial force during processing, is made in the form of a press column consisting of two (upper and lower) all-metal cylinders, a stay rod and a strip bandage. The pressing chamber itself contains a high-pressure cylinder consisting of a tube with end rings and pre-stressed band fixed on it. The working chamber contains an electric heating element and a cooling and high-pressure gas feed system. The press column is installed on rails.

The device for thermal treatment of powder materials under high pressure, adopted as the second analog, excels the first analog significantly by its technological capabilities because it allows to carry out technological processing at higher temperature and pressure ranges.

However, the design solution of the blocks that absorb pressure stresses has a series of essential shortcomings that reduce technological capabilities of the device during operation and lower the cost-effectiveness and the safety of the design in general. Thus, f. ex., the design solution of the high-pressure cylinder, though reinforced by the band, has a low-efficiency cooling system what restricts the temperature range of the technological process and increases the cooling liquid consumption.

On the other hand, the design of the press column containing all-metal cylinders is highly metal-consuming. Generally, such design involves high manufacturing costs what makes it uneconomical.

The nearest analog (prototype) of the declared technical solution, "Pressure Module of Autoclave", is the prospectus of ASEA company AQ00-102R, of 1977, where a principal design of isostatic press is described in detail.

The prototype isostatic press (autoclave module) has a high-pressure vessel consisting of a high-strength steel cylinder with a winding made of pre-stressed steel wire, the end closures for axial sealing of the vessel, and a yoke. The frame consists of two all-metal half-cylindrical rams and two columns that separate them. The rams and the columns are reinforced by a large number of layers of pre-stressed high-strength wire.

This prototype isostatic press has significant advantages over the above described analogs, primarily by ensuring its high operational safety.

However, the prototype isostatic press is extremely high metal-consuming. All-metal (cast, forged etc.) design of rams leads by itself to high consumption of metal while complete overlapping of end closures by the rams makes the matter even worse. Other shortcomings of the same order include all-metal design of columns located between the rams. The frame of the prototype apparatus in general is highly metal-consuming and heavy, what complicates the operation and requires additional hoisting & transporting equipment and, therefore, increase in the height of the working shop and additional costs. Moreover, the design of the vessel itself made of one high-strength cylinder, though reinforced by wire winding, cannot fully guarantee an efficient cooling of the vessel's working chamber, what also leads to restrictions of the technological process's parameters.

ESSENCE OF THE INVENTION

The proposed invention solves the problem of lowering the metal consumption of apparatuses similar to the described analog, enhancing the reliability and simplifying the operation.

The declared task and the technical effect achieved thereby, are based on the proposed autoclave pressure module containing a vessel with inbuilt hermetically sealed movable end closures, the rams restricting axial shift of these closures, and a pressure yoke. A special feature of the apparatus is that the pressure yoke is made in the form of three oval yoke sections: two lateral sections encompassing the rams, and one central section encompassing the rams and the vessel with closures, all of them equidistant from each other on the ram's length, whereby the lateral oval sections are made in such a way as to allow opposite shift while all said oval sections are made in such a way as to allow shift off the rams for a length ensuring free withdrawal of the rams and the end closures. The ram of the autoclave pressure module is made as a combination of thick steel sheets with gaps, whereby in the points of contact with the oval yoke sections, the gaps between the sheets are filled by inserts made of steel sheets whose thickness is equal to the respective gaps. The length of the insert sheets exceeds by a factor of 1.05–1.1 the width of the oval yoke sections, and the insert sheets are fastened together with the ram sheets. Each oval yoke section is made in the form of a welded framework pre-stressed with high-strength steel wire. The vessel of the autoclave pressure module is made as multi-cylinder, with adjoining welded metal shells fastened by a high-strength steel wire winding, while one of the inside metal shells is made with slits for channels of a cooling liquid. Between the upper and lower rams and the central oval yoke section, there are spacers made in the form of two cylindrical half-rings that are concentric with respect to the ram's surface and joined together by welded-in radial ribs of steel sheet. In this way the inner cylindrical half-ring rests on the ram while the outer cylindrical half-ring rests on the central oval yoke section.

THE LIST OF DRAWINGS

The pressure module of the autoclave is shown on FIGS. 1–3.

Figure 1:
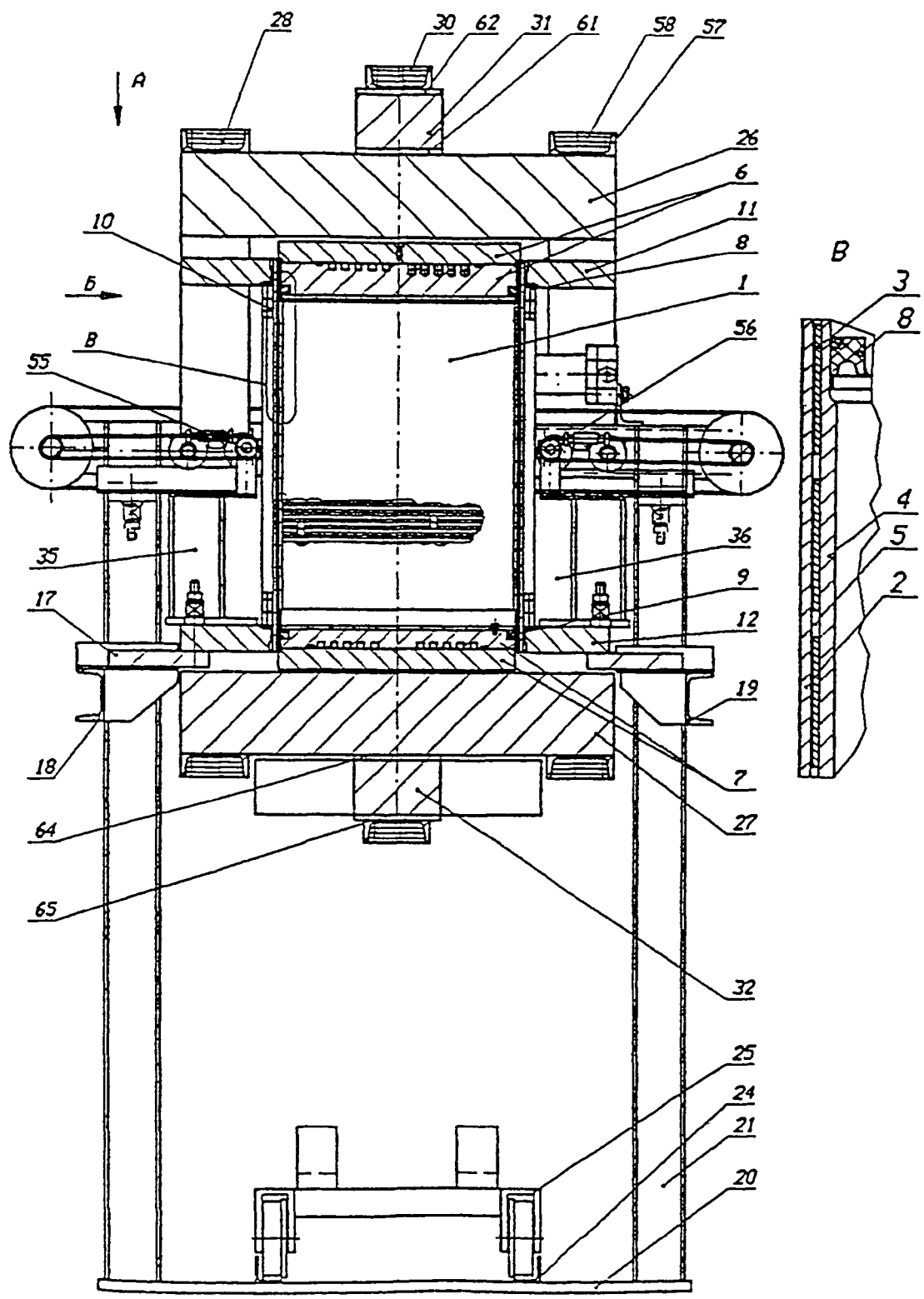
FIG. 1 shows the sectional view of the autoclave pressure module and the enlarged view of a fragment of the vessel's wall.
Figure 2:
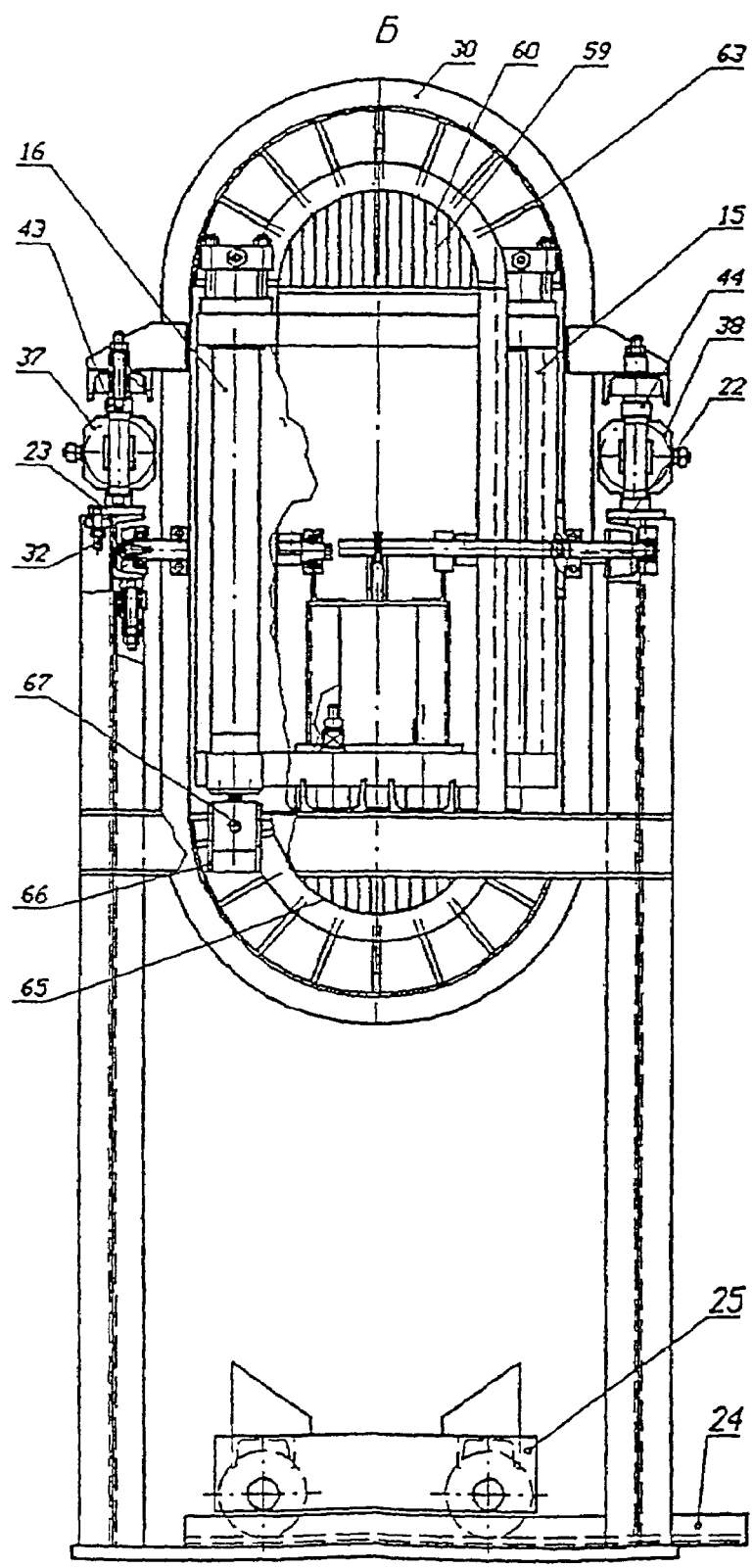
FIG. 2 shows the autoclave pressure module, view B as of FIG. 1, the side view.
Figure 3:
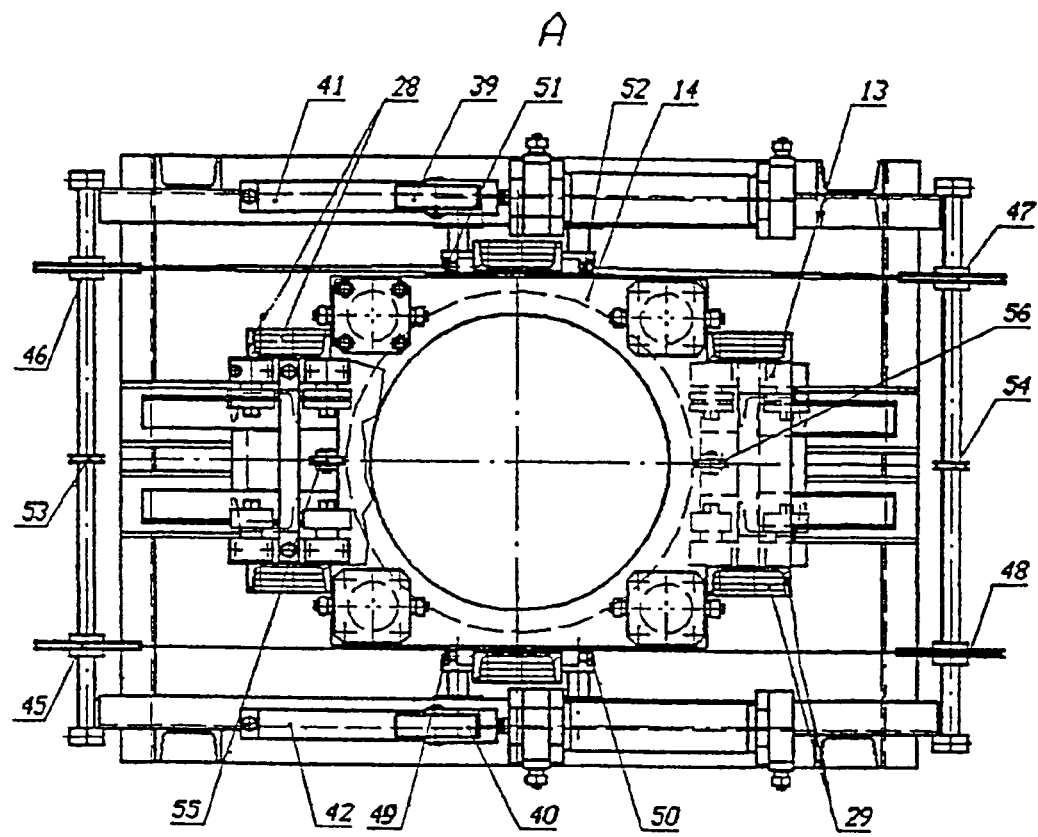
FIG. 3 shows view A as of FIG. 1, the top view of the autoclave pressure module.

The autoclave pressure module contains the vessel 1 made as multi-cylinder, with welded shells of sheet metal fitted into each other. The central cylindrical shell 3 is made with slits 5 for circulation of the cooling liquid.

The vessel is fitted at its ends with the upper 6 and lower 7 closures detachable in horizontal plane, with inputs of the working medium, cooling, current supplies etc. (not shown).

The upper 6 and lower 7 closures are fitted with seals 8 and 9 respectively, ensuring a hermetic sealing of the vessel during technological processing.

To enhance its strength and to lower its metal consumption, the vessel is pre-stressed using the winding of high-strength steel wire 10. The vessel's winding is located between two step flanges—upper step flange 11 and lower step flange 12, fixed on the upper and lower end of the cylindrical shell 2 of the vessel 1. Each of the step flanges 11 and 12 is made with the central orifice ensuring that the flange fits onto the outer surface of cylindrical shell 2, free of the winding.

The upper step flange 11 and the lower step flange 12 have narrow end parts 13 and a broad central part 14. The upper 11 and the lower 12 step flanges are joined together at four angles of their central parts by clamp bolts 15. The clamp bolts 15 are usually made of standard solid rolled profiles. Inside each of the clamp bolts 15, hydraulic cylinders 16 are inserted into the flanges' orifices.

With the help of detachable adjustable connections (e.g. puller nuts and bolts), the vessel 1 is fastened by the outside parts of the lower flange 12 on the supports 17 that are rigidly fixed on the cross-bars 18 and 19 of the welded base 20 of the autoclave pressure module. The base contains vertical columns 22 and cross-bars 18, 19, 22 and 23 mounted on the base plate. The columns 21 and cross-bars 22 are installed in such a way that a gap ensuring the passage of the central oval yoke section is created in the horizontal plane between the surfaces of the central part of the lower step flange and the cross-bars 22 and 23.

The base plate 20 is equipped with the guides 24 on which the carriage 25 is installed. The upper and lower closures of the vessel are overlapped by the upper 26 and lower 27 rams that are in contact with the closures. The two lateral oval yoke sections 28, 29 and the central oval yoke section 30 have a winding of high-strength steel wire. The lateral oval yoke sections encompass the rams and have contacting surfaces equidistant with them. The central oval yoke section encompasses the vessel, including the broad part of the flanges, and fits into the gaps between the cross-bars 22, 23 and the lower step flange. The area of the contacting surfaces of the vessel's rams and closures does not exceed ⅚ of the sectional area of the vessel's inner cylindrical surface.

The two lateral oval yoke sections 28 and 29 are located at the edges of the rams while the central oval yoke section 30 is in the middle. Therewith the central oval yoke section encompasses the rams with the help of spacers conjugated with the rams—the upper spacer 31 and the lower spacer 32.

On vertical surfaces of the oval yoke sections, the supporting rollers 34 are installed on cantilevers 33. Therewith the lateral oval yoke sections 28 and 29 move along the guides 35, 36 fixed on the inner surfaces of narrow ledges of the lower step flange, while the central oval yoke section moves along the base cross-bars 22, 23. Also, on cross-bars 22, 23 the hydraulic cylinders 37, 38 are mounted, with the gears 39, 40 fixed on piston rods and engaged with immovable racks 41, 42 on cross-bars 22, 23, and with movable racks 43, 44 on the central oval section. On cross-bars 18, 19, the step blocks 45, 46, 47, 48 are mounted. The outer blocks of a larger diameter form a cable gear in such a way that the steel rope ends 49, 50, 51, 52 are fixed from different sides of the vertical parts of the central oval section and the cables are lap-wound on the blocks. The blocks of a smaller diameter 53, 54 are mounted on the same axis with the large blocks. The blocks of the same diameter 55, 56 are fixed on the supports with the guides 35, 36 of the lateral oval yoke sections 28, 29. These blocks also form a rope gear for moving the lateral oval yoke sections 28, 29. The rope ends of the upper and lower branches are fixed respectively from the opposite sides of each of the lateral oval yoke sections 28, 29. The ratio of the larger and smaller diameters of the blocks is the same as the ratio of the paths of the central and lateral oval yoke sections 30, 28, 29.

To fasten the oval yoke sections 28–30 after they are moved into the required positions, the limit stops are made (not shown). The yoke sections themselves are made of profiled rolled metal 57, mainly channel, with a high-strength wire 58 wound in its interspace.

The rams are made of thick steel sheets 59 with gaps between them and in such a way that one of its surfaces forms a semi-cylinder while the other surface is a plane.

At a length equal to the width of the lateral oval yoke sections 28, 29 from the ends, and at a length equal to the width of the lateral oval yoke sections 28, 29, and in the middle of the ram at a length equal to the width of the central oval yoke section 30, additional sheets 60 are inserted between the sheets 59, whose thickness is equal to the gaps between the sheets 59. The sheets 59 and 60 are joined by welding.

The upper spacer 31 is made in the form of two cylindrical semi-rings—the inner one 61 and the outer one 62, concentric to the ram's surfaces, and the semi-rings themselves are joined together by radial metal ribs 63 welded in them. The width of the upper spacer is equal to the width of the central oval yoke section 30. The lower spacer 32 is made similarly to the upper one with the sole difference that at the ends of the ribs between the cylindrical semi-rings 64, 65, coaxially to the hydraulic cylinders 16, four cylindrical sleeves 66 are welded on, whose inside diameter corresponds to the outside diameter of the hydraulic cylinder rods 16.

The sleeves and the rods that enter them have apertures. On the ribs there are also installed fixing devices 67 for fixing hydraulic cylinder rods 16 in sleeves 65.

The device is made in the form of hydraulic cylinders with rods entering the apertures of the sleeves 66 and hydraulic cylinders rods 16.

The pressure module of the autoclave operates as follows:

After the pressure module is assembled and all of its systems are tested without load, the pressure inside the vessel 1 is brought to the atmospheric level. Under the effect of gravity, the upper closure 6 with the upper ram 26 and the upper spacer 31 descends to the upper end of the vessel. The lower ram 27 with the lower spacer 32 and the lower closure 7 descends on the oval surfaces of the oval yoke sections. With the help of hydraulic cylinders 16, whose rods are joined by fixing devices 67 with the lower spacer 32 and the lower ram 27 using the sleeves 66, the lower spacer 32, the lower ram 27 and the lower closure 7 are lifted into the topmost position. As a result, gaps are formed between the oval surfaces of the lateral oval yoke sections 28 and 29, the rams 26 and 27, and the spacers 31 and 32 of the central oval yoke section.

Using hydraulic cylinders 37 and 38 with rack gear, the central oval yoke section 30 is roller-shifted in the direction of the lateral oval yoke section 28. Therewith, thanks to the rope gear of the central oval yoke section, the blocks 45, 46, 47, 48 and the smaller-diameter blocks 53 and 54 fixed on the same axis with them, are brought into rotation. Therefore, the rope gears of the lateral oval yoke sections 28, 29 that shift in the opposite directions are brought into motion. And owing to the respective block diameters ratio, all oval yoke sections 28–30 are shifted from the rams thus enabling the removal of the rams, the spacers and the closures.

When loading is made from below, the carriage 25 is placed under the lower ram 27, the lower spacer 32 and the lower closure 7. With the help of hydraulic cylinders 16, the lower spacer 32 with the lower ram 27 and the lower closure 7 is put down on the carriage 25. The fixing devices 67 of hydraulic cylinders' rods 16, under oil pressure in the hydraulic cylinders, are disengaged releasing the hydraulic cylinders' rods 16. The hydraulic cylinders' rods 16 go up enabling the carriage 25 with the lower spacer 32, the lower ram 27 and the lower closure 7 to move out from under the vessel 1 to the area accessible for a lifting crane. The workpiece to be processed is loaded onto the lower closure 7. The carriage 25 with the lower spacer 32, the lower ram 27 and the lower closure 7 with the load are moved to the position of the axis of the vessel 1. The cylinders rods 16 go down, the fixing devices 67 come into action and the hydraulic cylinders 16 lift the lower spacer 32, the lower ram 27 and the lower closure 7 with the load introducing the lower closure 7 with the load into the vessel 1. The carriage 25 is moved from under the vessel 1 and the hydraulic cylinders 37and 38, using rope gear, shift the oval yoke sections 28–30 into the working position. Thus the pressure module is assembled and ready for technological processing.

When loading is made from above, after the oval yoke sections 28–30 are shifted into the topmost position, the lifting devices take off the upper spacer 31, the upper ram 26 and remove the upper closure 6. The workpiece to be processed is loaded into the vessel 1, the vessel 1 is closed by the upper closure 6, the upper ram 26 and the upper spacer 31 are installed.

The oval yoke sections 28–30 are shifted into the working position in the same way as with the loading from below.

INDUSTRIAL USAGE

The proposed pressure module has low metal consumption, is reliable and simple in operation and it may find wide usage for processing metal powers at high pressures and temperatures.

What is claimed is:

1. An autoclave module comprising
    a vessel that includes hermetically sealed movable end closures, rams restricting an axial shift of these closures, and a pressure yoke,
    wherein the pressure yoke is made in a form of three oval yoke sections—two lateral sections encompassing the rams, and one central section encompassing the rams and the vessel with closures, all of them equidistant from each other on the ram's length,
    whereby lateral oval sections are made in such a way as to allow opposite shift while all said sections are made in such a way as to allow shift off the rams for a length ensuring free withdrawal of the rams and the end closures; and
    wherein the ram is made as a combination of thick steel sheets with gaps, whereby in the points of contact of the rams with the oval yoke sections, the gaps are filled by inserts made of steel sheets.

2. The autoclave module of claim 1,
    wherein said steel sheets have a thickness which is equal to the respective gaps and whose length exceeds by a factor of 1.05–1.1 the width of the respective oval yoke section.

3. The autoclave module of claim 1,
    wherein each oval yoke section is made in the form of a welded framework with a winding of high-strength steel wire.

4. The autoclave module of claim 1,
    wherein the vessel is made as multi-cylinder, with adjoining welded sheet metal cylinders fastened by a high-strength steel wire winding, while one of the inside metal cylinders is made with slits for channels of a cooling liquid.

5. The autoclave module of claim 1,
    wherein between the upper and lower rams and the central oval yoke section, there are spacers made in the form of two cylindrical half-rings concentric to the rams' surfaces, and between them radial ribs of steel sheet are welded in, whereby the inner cylindrical half-ring rests on the ram while the outer cylindrical half-ring rests on the central oval yoke section.

* * * * *